Patented June 28, 1932

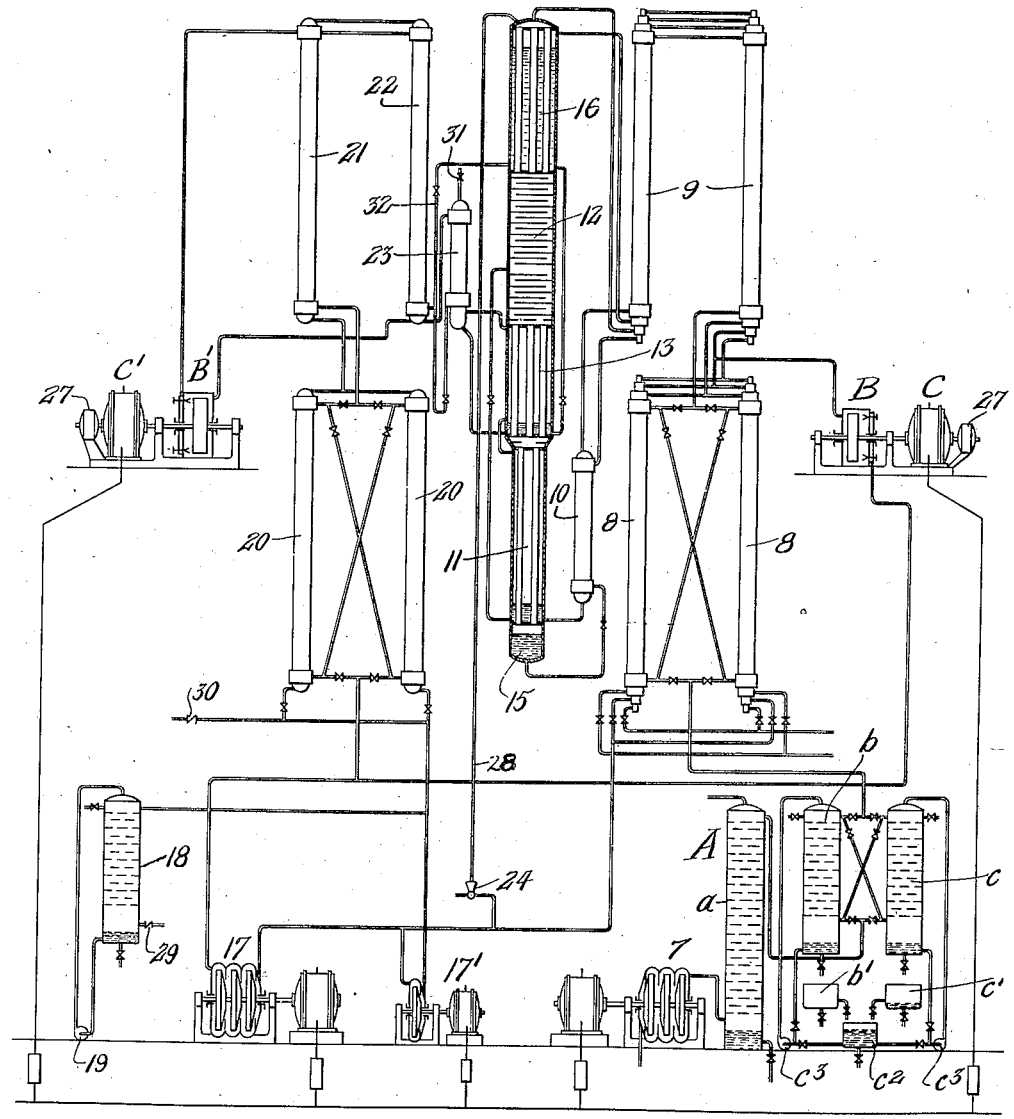

1,864,585

UNITED STATES PATENT OFFICE

WILLIAM L. DE BAUFRE, OF NEW YORK, N. Y.

ART OF RECTIFYING MIXED GASES

Application filed February 18, 1927. Serial No. 169,338.

This invention relates to the art of rectifying mixed gases, and particularly air.

The primary object of the invention is to simplify and decrease the cost of rectification.

Other and more specific objects and advantages will appear in the following description of my invention taken in conjunction with the drawing, which diagrammatically illustrates the preferred manner in which I carry out my invention.

In general, I propose to employ two cycles. With this I prefer to combine the compression of more gas than is to be rectified. I employ the foregoing for the reason that I have found that in completely separating a mixed gas, such as air, by rectification—

(a) The mixed gas must be cooled to its dew point and may be more or less liquefied before being introduced into the rectifier.

(b) Heat must be added in sufficient quantity below the inlet to the rectifier to completely separate the more volatile from the less volatile constituent.

(c) Heat must be abstracted in sufficient quantity above the inlet to the rectifier to completely separate the less volatile from the more volatile constituent.

(d) Refrigeration must be provided to balance heat leak and other thermodynamic losses.

The process which I propose contemplates accomplishing certain of the items by what may be called a separation cycle, and others by a heat exchange cycle or cycles. In the preferred practice of my invention, I propose to accomplish the first three items in the separation cycle and the last item by an external refrigeration cycle, although other combinations may be used, such as a separate heat exchange cycle for items (b) and (c), or the combination of this heat exchange cycle with the refrigeration cycle. In the separation cycle I propose to compress more air than is to be rectified in order to furnish the medium for accomplishing items (b) and (c).

The provision of an external cycle distinct from a separation cycle enables me to carry out the process by compressing the gas to be rectified to just the pressure required to transfer heat for the particular pressure of rectification selected. This effects a great saving in power consumption over that which is required in the standard methods of separation now practiced, in which it is customary to compress the gas to very high pressures,— i. e., pressures far in excess of that required to effect the necessary heat transfer in separation. The excess pressure is employed in order to secure, by expansion, the additional refrigeration necessary to balance heat leak and other thermodynamic losses. By the employment of two cycles, it is unnecessary to resort to excess in pressures, and, in addition, the refrigeration is produced in a more efficient manner.

A consequent advantage following from the reduction in pressures is that I am enabled to employ a turbo-compressor in the separation cycle, and also in the external cycle, instead of the usual reciprocating compressor. I am also enabled to employ an expansion turbine at higher thermal efficiency than the more common expansion reciprocating engine, particularly where, as in my process, the return pressure is about atmospheric, and if one of the constituents of the mixed gases obtained by rectification is utilized as a refrigerant.

Referring to the figure, about twice as much air as is to be rectified is drawn in from the atmosphere by the turbo-compressor 7, and compressed therein to from about 60 to 100 pounds gauge, preferably 75 pounds gauge. By the use of an external refrigeration cycle and the operation of the separation cycle at a pressure of less than 150 lbs. gauge, the use of a turbo-compressor becomes practicable. One of the marked advantages incident to the employment of a turbo-compressor is that the gas compressed is not contaminated by hydrocarbons, as is the case with a reciprocating compressor.

The minimum pressure in the separation cycle is that necessary to overcome frictional resistance in the interchangers, piping, etc., and to produce a pressure around the tubes in the lower tube sections 11 and 13 of the rectifying column sufficient to liquefy the compressed air by imparting the heat required for rectification in boiling oxygen-rich liquid. Thus, the rectification pressure under which the oxygen rich liquid boils determines the pressure to which the air is to be separated must be compressed. The rectification pressure must be just sufficient to liquefy nitrogen rich vapor by heat transfer to the refrigerant around the tubes in the tube section 16 at the rectifier top. By the utilization of the more volatile constituent of the air to be separated, namely, nitrogen, in liquid form as the refrigerant, a minimum pressure difference is required to produce the temperature necessary for heat transfer. Hence, the lowest power consumption for compressing the air to be separated follows from utilizing, as a refrigerant for rectification, the more volatile component of the air in a relatively high state of purity and in liquid form, vaporizing it under approximately atmospheric pressure, adjusting the pressure of rectification to a value just enough to condense sufficient of the more volatile component to provide the desired reflux by heat transfer to the refrigerant, and compressing the air to just sufficient pressure to liquefy it by heat transfer to the fluid undergoing rectification rich in the less volatile component.

It will be further noted that the tube sections 11 and 13 of the column are so arranged, as will be pointed out later, that the less volatile compent condenses out of the air being rectified more rapidly than the more volatile component, so that a lower and lower temperature is required as liquefaction proceeds with the vapor flowing up around the tubes. By arranging the heat transfer in the lower part of the rectifier so that rectification is taking place as the fluid undergoing rectification is receiving heat, the liquid is rising in temperature as it flows down within the tubes. Consequently, with the fluid undergoing rectification and the liquids flowing downward while receiving heat, and the compressed air flowing upward while liquefying and having its less volatile constituent reduced in imparting the heat for rectification, it becomes apparent that the temperature-heat relations for the two fluids approach to parallelism rather than diverge. This reduces the pressure difference necessary for heat transfer, and thus for a given rectification pressure further reduces the pressure to which the air to be rectified must be initially compressed with consequent saving in power and increasing the availability of the turbo-compressor for this purpose.

A turbo-compressor occupies much less space than the usual reciprocating compressor, which effects a saving in cost of foundations and buildings, and it also has a lower maintenance cost. The principal advantage is the absence of contamination of the compressed air by hydrocarbon vapors. Lubricating oil vaporizes more or less in the compressed air at the temperatures incident to compression. The vapors in passing into the interchangers of the separation cycle are condensed and more or less solidified on the tube and pipe surfaces, which reduces heat transfer and increases the frictional resistance to flow, which, of course, are detrimental from more than one standpoint. The hydrocarbons also collect in the liquid oxygen produced in rectification. This collection or concentration of hydrocarbons may become dangerous enough to produce explosion. The use of a turbo-compressor eliminates any danger from this source.

After compression to 75 lb. gauge or 6 atmospheres absolute, the air is passed through a carbon dioxide removal device A which comprises the three towers a, b and c. In each of these towers the compressed air passes upwardly in counterflow to a purifying liquid trickling downward over packing material supported within the towers. In the first tower the liquid employed is water which has been in contact with atmospheric air containing 0.03 percent of carbon dioxide. Consequently, the absorbed carbon dioxide in this water is in equilibrium with atmospheric carbon dioxide having a partial vapor pressure of 0.0003 atmosphere. Due to the compression of the air in the turbo-compressor to 6 atmospheres absolute, the partial pressure of the carbon dioxide has been increased six times, namely, to 0.0018 atmosphere. An infinite supply of water with sufficient time of contact would reduce the partial pressure of the carbon dioxide to its original value of 0.0003 atmosphere, absorbing five-sixths of the carbon dioxide contained in the air. This, however, is not practical, and only from one-fourth to one-half is absorbed. This effects a saving in the corresponding amount of chemical required for further purification. While the employment of surface water to reduce carbon dioxide is not novel, the two cycle process makes its use practical, since the air to be separated is compressed only to such a pressure that the cost of the towers and of the power required for circulating the water which may be afterwards utilized for cooling the compressors do not become excessive.

From the preliminary absorption tower a the compressed air passes to the caustic soda or potash towers b and c through which the air passes in series. These two towers are so connected and controlled by valves that the air may be passed through either tower first and so that either tower may be cut out of service while the other tower is in use. By such arrangement the air may always pass first through the tower containing the solution longer in use and last through the tower containing the fresher solution. Consequently, smaller towers may be used to secure a high degree of purification.

The arrangement shown contemplates the recausticizing of the soda or potash solution by means of lime. After the solution longer in use has become spent, that tower is cut out of circuit and the relief valve opened to permit of the escape of the compressed air, the other tower remaining in circuit. The spent solution is then run into the tub $b'$ or $c'$, as the case may be, wherein lump lime is introduced while the solution is stirred. The lime recausticizes the solution, forming calcium carbonate, which settles as a sludge in the bottom of the tub. The recausticized liquid is then drained into the lowest tub $c^2$. It is not necessary to wait, however, until the recausticizing process is completed before putting the tower into service again, as recausticized liquid from the other tower should be available in the lowest tub when this tower is drained. The tubs are arranged to permit the recausticizing process to be carried out between the times of replacing a spent solution by a fresh solution. Centrifugal circulating pumps $c^3$ are employed and arranged so that fresh solution may be pumped into the tower from the lowest tub as well as circulated in the tower. The tower put into service with fresh solution is always inserted for the air to pass through it last.

It has been customary to use carbon dioxide removal towers—although not of the arrangement shown—on the suction side of the compressor of air liquefaction plants. They have not heretofore been used on the discharge side because of the high pressures, from 500 to 2500 lbs., which are ordinarily employed in such plants. Where, as in my two-cycle process, the pressure is only about 75 lbs., the use of such towers on the discharge side becomes practical, and owing to the greater air densities, smaller towers may be used for the same purification than if the towers were on the suction side of the compressor.

Leaving the carbon dioxide removal towers, the compressed air nearly freed of carbon dioxide but containing considerable water vapor, enters one of the interchangeable sections 8—8 of the interchanger apparatus, passing thereafter through the second one, and thence into the last section 9 of the interchanger, which is permanently in circuit. It leaves the interchangeable or reversible sections of the interchanger at a temperature of approximately minus 30 centigrade. Most of the water vapor is removed in the reversible sections in liquid form, but ice in appreciable amounts forms where the temperature drops to below the freezing point, zero centigrade. When this ice begins to obstruct the flow, the first sections of the interchanger are reversed so that the compressed air will first pass through the section in which ice has collected in order to melt such ice.

Refrigeration is lost when these interchanger sections are reversed, not only in the accumulated ice, but also in the cold metal and other parts. The continual condensing of water vapor and its drainage from the interchanger in liquid form likewise costs refrigeration. The refrigeration so lost is at temperatures varying from atmospheric to minus 30 centigrade. In order to balance this loss at these temperatures rather than balancing them at very low temperatures—which would be more costly—I provide refrigeration approximately at the working temperature range of the interchanger sections in addition to that furnished by the returning fluid. To this end I provide the small auxiliary turbine B. Compressed nitrogen is expanded from room temperature through the nozzles of this turbine, and the kinetic energy of the jets largely conveyed out of the system by an electric generator C which will be hereinafter described. The expanded nitrogen, cooled to about minus 40 centigrade, is introduced into the returning nitrogen stream at a point between the reversible and the permanently in circuit sections of the interchanger where the temperature of the returning nitrogen is approximately the same. The warming of this extra quantity of returning nitrogen to approximately room temperature furnishes the refrigeration required to balance the loss in the reversible interchanger sections due to condensation and freezing of water vapor therein, and to the stored up refrigeration in the metal parts. The refrigeration is thus furnished within the temperature range needed, and, therefore, with a minimum power expenditure in the compressor furnishing the compressed nitrogen for this purpose. That is to say, less compressed nitrogen must be expanded from a given pressure and atmospheric temperature to abstract a given amount of energy from the system than if this compressed nitrogen were cooled before expansion to say minus 130 centigrade. Thus, the provision of the auxiliary turbine reduces the power required to drive the compressor 17 of the refrigeration cycle.

There is also an improvement in the temperature-heat relations in the interchanger. The latent heat removed to condense the water vapor in the reversible sections of the interchanger produces an effect similar to an enlarged heat capacity of the air being cooled. The introduction of the cold expanded nitrogen into the returning nitrogen stream before it enters the reversible sections of the interchanger produces an increase in the heat capacity of the returning streams. Sufficient cold expanded nitrogen should be introduced to make the temperature-heat relations of the downgoing and returning streams substantially parallel in the reversible sections. This also brings the temperatures closer together in the other section of the interchanger. Thus, the power loss due to heat transfer in the separation interchanger is reduced.

That part of the interchanger permanently in circuit is divided into two portions 9—9 for reasons touching the structure, and the general arrangement of the parts, and which per se are not claimed herein.

The compressed air is cooled in the interchanger to close to the dew point by the returning nitrogen stream, the returning vaporized oxygen and by the returning vapor drawn from the space around the tubes of the upper tube section 16 of the rectifier. Before entering the rectifier and after leaving the interchanger the downgoing compressed gas is cooled to the dew point and partly liquefied in the exchanger 10, this further cooling being accomplished by the heating in exchanger 10 of the liquid oxygen taken from the pot 15 at the bottom of the rectifier and led through the exchanger in heat interchanging relation with the downgoing gas. The exchanger, as above noted, serves to vaporize this oxygen liquid. Another advantage of the double cycle process is that the pressure of the compressed air has been so reduced relative to the pressure of the returning streams of oxygen and nitrogen that their temperature-heat relations are also substantially parallel in the interchanger sections 9—9. This minimizes the power loss due to heat transfer. Where the temperature variations of cooled and heated fluids are diverging as the temperature is lowered, as occurs in present practice with the system operated from 500 to 2500 lbs. per square inch, the power cost is much greater.

The compressed, cooled and partly liquefied air is introduced into the bottom of the tube section 11 in the space around the tubes thereof, and bubbles through the liquid collecting around such tubes. In consequence of which this liquid is very rich in oxygen and the vapors above it are correspondingly rich in nitrogen. That portion of the compressed air which is to be rectified is drawn off from the lower part of the tube section 11 in liquid form and is throttled to the rectification pressure, say from 5 to 25 lbs. gauge, into the tray section 12 of the column, preferably at a point where there are more trays above than below the inlet. The excess air now in the form of nitrogen rich vapor is drawn off from the upper part of the tube section 11 and delivered into the tube section 13. A portion of the air thus delivered to the tube section 13 is liquefied in the imparting of heat to the liquid trickling down through the tubes thereof. A portion of the vapor in such tube section is drawn off at the upper part thereof and is cooled in the vaporizer 23 of the external cycle, it being cooled and liquefied by the imparting of heat to the liquefied nitrogen of the external cycle. The liquefied vapor is returned from the vaporizer 23 to the bottom of the tube section 13. The liquid thus collecting is throttled to approximately atmospheric pressure into the upper tube section 16, there imparting the refrigeration necessary to condense the impurities out of the nitrogen vapor rising through the tubes of such tube section. The additional refrigeration imparted by the external cycle balances heat leak and other thermo-dynamic losses. Further description of the utility of compressing more air than is to be rectified will be pointed out hereinafter.

The three returning streams from the column are, therefore, one of commercially pure oxygen in gaseous form and two streams of gaseous nitrogen. The oxygen and one of the nitrogen streams are at approximately atmospheric pressure, but the nitrogen returning from the rectifier top is at the rectification pressure reduced by such frictional resistances as are encountered in the interchanger and piping. One of the objects of the invention is to recover the energy of this nitrogen above atmospheric pressure. This is accomplished by utilizing the nitrogen in the external cycle, admitting it to the suction side of the turbo-compressor 17 without reduction in pressure.

As long as the demands of the external cycle are less than the supply of this nitrogen from the rectifier, the rectification pressure may be automatically controlled by an automatic pressure relief valve 24 located in the pipe 25 branching off from the nitrogen pipe 26. This automatic pressure relief valve discharges the excess nitrogen, the control chamber of the valve being connected to the rectifier top or elsewhere by pipe 28. The rectification pressure can also be automatically controlled by a pressure controller on the refrigeration compressor such as are now available, particularly for turbo-compressors. These controllers vary the speed of the compressor to maintain constant the suction pressure for which they are set.

There may be times, however, when the demands of the refrigeration cycle are greater than the supply of nitrogen under pressure from the separation cycle. To take care of this situation, I provide a small compressor 17', preferably of the centrifugal type, to make up the deficiency by raising a portion of the nitrogen returning from the refrigeration cycle, to the rectification pressure and supplying it to the suction side of the main compressor 17. This auxiliary compressor can be automatically governed to maintain a constant discharge pressure at its outlet or any other point in its system, such as the rectifier top, thus maintaining the rectification pressure constant. Or, the auxiliary compressor can operate at constant speed to supply an excess of slightly compressed nitrogen, the pressure of which is automatically regulated by the automatic pressure relief valve 24. Any of these means enable the energy in the nitrogen returning from the rectifier to be recovered by reducing the power required for compression in the external refrigeration cycle, while, at the same time, the pressure of rectification is controlled to maintain the desired purity of the products of rectification.

The use of this nitrogen as the refrigerating fluid in the external cycle has a number of advantages. First, it is a more nearly perfect gas than air, and, consequently, a higher pressure can be used than with air, and still maintain substantial parallelism in the temperature-heat relations of the downgoing and returning streams in the refrigeration interchanger. Thus, the power loss due to heat transfer in the refrigeration interchanger is minimized. In order to still further reduce the loss, the interchangers are made twice as long relative to the tube diameter as in present systems, that is to say, the length of the tubes is about 1400 times the internal diameter of one-fifth inch. This brings the parallel lines of the temperature-heat relations of the downgoing and returning nitrogen streams close together.

Thus, by the two cycle process of separating air into its components, the pressure of the air to be rectified may be reduced to such a pressure that the temperature heat relations of the downgoing compressed air and the returning streams of oxygen and nitrogen in the separation cycle are substantially parallel and by utilizing one of the components of rectification as the refrigerating fluid in the external cycle, namely, nitrogen, the same parallelism is secured in the interchanger of the refrigeration cycle. By making both separation and refrigeration interchangers of great length relative to the internal tube diameter, the temperature differences are decreased to low values. This materially reduces the power losses corresponding to heat transfer in the interchangers.

It is not desired, however, to go to high pressures in the refrigeration cycle, and I employ only such moderate pressures in large oxygen plants as may be produced by commercial turbo-compressors. This cannot be done in single cycle systems. I desire to do so in order to utilize a compressor in which the compressed air is not contaminated by hydrocarbon vapors. By the elimination of such vapors, the plant may operate for much longer periods than if the heat transfer effectiveness were reduced by the accumulation of deposits on the heat transfer surfaces, or if the efficiency of the turbine B (or the turbine expander B') were reduced by such accumulations on the blades.

A further advantage of the use of nitrogen in the external cycle is that this nitrogen returns from the separation cycle where it has encountered approximately as low a temperature as it will meet in the refrigeration cycle. In particular, in the expansion turbine B', it will not reach the point of liquefaction. Hence, no trouble will be experienced in the turbine or elsewhere by the deposition of carbon dioxide snow or ice from water vapor.

Referring now to some of the details of the external cycle of refrigeration, the turbo-compressor 17 compresses the refrigerant to about 150 lbs. or less and discharges into the interchanger. The refrigeration interchanger is also provided with two leading-in reversible sections 20—20 followed by a section 21 permanently in circuit. The nitrogen vapor is cooled to about minus 130 centigrade in the interchanger, and, as the nitrogen leaves the section 21, it divides, a portion of the nitrogen going to the liquefier 22 of the external cycle and a portion to the turbine expander B' hereinbefore mentioned. That portion of the nitrogen passing through the turbine expander joins with the nitrogen vaporized in the vaporizer 23, and is used in return in heat interchanging relation with the downcoming nitrogen to be liquefied in the liquefier 22.

It has heretofore been proposed to use such a turbine expander B', but its use is ordinarily impractical, and I have rendered it practical by employing the two cycle system described, as I thereby reduce or eliminate the causes of inefficient operation which heretofore have made the turbine expander impractical. In connection with this the absence of carbon dioxide, water vapor and oil vapor in the refrigerant is an important factor. In addition, by separating the refrigeration cycle from the separation cycle, the return pressure existing in the turbine casing may be made approximately atmospheric, which nearly eliminates all packing troubles around the rotating shaft. In a single cycle liquefaction system the pressure in the turbine casing is from 5 to 6 atmospheres, or more, which involves heavy power loss for rotating the relatively tightly packed shaft, and also heavy maintenance cost to replace the packing which wears very rapidly. Where the pressure is approximately atmospheric, a much less tight packing will suffice, power is cut down, and the packing does not wear nearly so rapidly. Furthermore, reduction of pressure in the turbine casing to approximately 1 atmosphere absolute reduces the windage loss of the rotating turbine wheel to a low value. Again, the turbine is more efficient than a reciprocating engine under conditions of low back pressure and moderately large ratio of expansion.

A turbine has further special advantages in that the power output of the turbine may be recovered and pumped back on electrical supply lines. This applies to both the turbine B and the turbine expander B'. To this end the turbine wheel is connected either directly or through reducing gearing to an alternating current synchronous electrical machine C (or C') constructed to act either as a synchronous motor or generator. The machine shown in the drawing has a direct current exciter 27 and the usual starting equipment is provided to start the machine as a synchronous motor. The turbine is started in this manner before the remainder of the refrigeration cycle is put into operation. With the valves for the turbine nozzles all wide open, the refrigeration compressor is started. The pressures in the system build up; the refrigerating fluid—air or nitrogen—expanding through the nozzles impinges on the turbine blades. This tends to rotate the turbine wheel. The reactions in the electrical machine maintain the synchronous speed, with the result that electrical power is pumped back into the supply mains at a rate determined by the amount of refrigerating fluid passing through the turbine nozzles and the velocity at which this fluid impinges on the blades of the turbine wheel. The latter is determined by the pressure from which the fluid expands through the nozzles.

The pressure head of the turbine nozzles builds up until it is sufficient to pass all the fluid through the nozzles at the rate supplied by the compressor. Several nozzles of the proper size are provided to permit all of the air or nitrogen from the compressor to expand through the nozzles to atmospheric pressure without exceeding the designed maximum pressure of operation. With a reciprocating or other positive displacement compressor the pressure between the compressor and the turbine nozzles will drop as the temperature at the nozzles decreases. By providing several nozzles with shut off valves, these may be closed one at a time manually or automatically as the pressure drops in order to bring back the pressure to its initial value. This will maintain the maximum amount of refrigeration available at any particular temperature at the turbine, which refrigeration decreases with the temperature, but would fall off still more rapidly if the pressure were permitted to decrease. When operating temperatures are reached the amount of refrigeration available for keeping the whole system running may be adjusted from time to time, simply by opening or closing one or more of the valves. The speed of the turbine will be constant, and the electrical energy pumped back into the supply mains will automatically vary with the number of nozzles in use and the corresponding initial pressure.

This electrical arrangement by which the turbine wheel always rotates at the same speed enables the turbine buckets to be designed for maximum efficiency at that speed. This efficiency will always be maintained as compared with the reduced efficiencies necessarily obtained in arrangements where the speed varies with changing load, as when electrical resistances are employed to waste the energy output of the turbine. The maximum nozzle efficiency will be obtained when the expansion turbine is used in combination with a turbo-compressor for the refrigerating fluid. The pressure-flow characteristic of the turbo-compressor being rather flat, but little change in pressure takes place as the turbine nozzles are shut off or turned on. No dangerous pressures are reached, even if all the turbine nozzles are shut off. As the temperature at which the refrigerant liquefies varies with the pressure, it follows that much more nearly uniform temperatures are maintained in the refrigeration system by the combination of turbo-compressor and expansion turbine.

What has been said above in connection with the turbine expander of the external cycle applies to the turbine B.

Both turbines are placed on an operating floor so located with respect to the separation unit that the exhaust pipes from the turbine are comparatively short.

In starting up the system, atmospheric air may be used as the refrigerant in the external cycle. In order to free this air of carbon dioxide, it is drawn in through the tower 18 wherein a solution of caustic soda or potash is circulated by the pump 19. A check valve 29 on the inlet to the tower permits a flow of air into the system only. This inflow is necessary to supply the mass of refrigerant to build the density of the refrigerant to operating pressures. When these pressures are reached and particularly when the whole system becomes operative to provide a supply of nitrogen for the external cycle, the inflow of atmospheric air ceases and pump 19 may be shut down. Thereafter the excess nitrogen returning at atmospheric pressure from the refrigeration interchanger is discharged through check valve 30. This check prevents the inflow of atmospheric air without purification during the starting up period. The reversible sections 20 of the refrigeration interchanger function to receive water vapor during the starting up period.

Referring now to the column, no heat is added or abstracted from the tray section 12. The tray section effects the rough stages of separation. The tube sections which act like an infinite number of trays effect the final stages of separation or purification, heat being abstracted from the rising vapors in the upper tube section 16, and heat being added in the two lower tube sections 13 and 11, the end products being commercially pure nitrogen vapor and commercially pure oxygen liquid, or any desired purity of one or the other of the end products. In this connection, the column is one which can be operated either as an oxygen recovery mechanism or a nitrogen recovery mechanism, or a mechanism for simultaneously recovering both commercially pure oxygen and commercially pure nitrogen, the results being obtained by variations in the pressure of rectification. The proportioning of the various parts of the column is determined by the relative purity of the products desired. The excess air compressed provides very heavy refluxes for complete separation. The compressing of more air than is to be rectified is very valuable in combination with a two cycle system, since the excess constitutes a medium which may be operated upon by the external cycle to provide the needed refrigeration. Also the highly volatile rare gases of the atmosphere accumulate in the excess from which they are most readily and economically removed at very low temperatures, provided by the vaporizer forming the connecting link between the external and separation cycles. These rare gases are removed through valve 31. A better separation of the rarer gases is obtained by the combination. This compressing of more air than is to be rectified, as well as certain features of construction of the rectifier and of the interchanger mechanism, are not specifically claimed herein, the same being the subject matter of my copending application, Serial No. 158,475, filed January 23, 1927, of which this is a continuation in part.

Furthermore, by providing a tube section at the top of the column in which the excess of air is normally evaporated, the main cycle may be put into operation without contaminating the portion undergoing rectification by supplying liquid refrigerant from the external cycle to the said tube section. In fact, the system may be operated continuously by so supplying refrigerant directly to this tube section. To these ends, I provide the connection 32.

By my two cycle process as high a purification from carbon dioxide is not required as where a single cycle is used. A further advantage of the two cycle process is that the design and construction of the interchangers and other parts are simplified and cheapened by reason of the thinner and lighter parts which may be safely used to safely withstand the internal pressures which are relatively low. In this construction of these parts, commercial materials are thereby made available which otherwise cannot be utilized because of the high pressures customarily employed.

I claim:—

1. In the rectification of mixed gases containing water vapor in a system including an interchanger, the step of supplying refrigeration to condense and freeze such water vapor which consists in passing, through the interchanger in addition to the returning fluid, a gas cooled approximately to the temperature of the interchanger at the region of its introduction, such gas being one of the products of rectification delivered from the warm end of the interchanger recooled to the said temperature.

2. In the rectification of mixed gases containing water vapor in a system including an interchanger, the step of supplying refrigeration to condense and freeze such water vapor which consists in passing, through the interchanger in addition to the returning fluid, a gas cooled approximately to the temperature of the interchanger at the region of its introduction, such gas being one of the products of rectification delivered from the warm end of the interchanger, compressed and recooled by expansion.

3. In a rectification process employing an external cycle of refrigeration, the compressing of the refrigerating fluid of said cycle, the expanding of a part thereof from a relatively high temperature and applying it to a relatively warm portion of the system, the expanding of another part after it has been cooled to a relatively low temperature and utilizing it in the liquefying of the remainder, and in applying the remainder to a relatively cold part of the system.

4. In a process of rectification, the utilization of the vapor component in an external refrigerating cycle by compressing it while approximately at the pressure of rectification and then cooling it and expanding a portion of it, utilizing the expanded portion to liquefy another portion and utilizing the liquefied portion for refrigeration in a rectification cycle.

In testimony whereof I have hereunto signed my name.

WILLIAM L. DE BAUFRE.